United States Patent [19]

August

[11] 4,169,471
[45] Oct. 2, 1979

[54] APPARATUS FOR THE PREPARATION OF FUEL MIXTURES FOR CARBURETORS

[76] Inventor: Paul August, Capellades 1, Barcelona 16, Spain

[21] Appl. No.: 842,686

[22] Filed: Oct. 17, 1977

Related U.S. Application Data

[63] Continuation-in-part of Ser. No. 541,522, Jan. 16, 1975, abandoned.

[51] Int. Cl.$^2$ ............................................. F02M 23/04
[52] U.S. Cl. ............................ 123/124 R; 123/124 A; 123/119 D; 123/119 B; 261/63
[58] Field of Search .......... 123/124 R, 124 A, 119 A, 123/119 B, 127, 119 D; 261/63

[56] References Cited

U.S. PATENT DOCUMENTS

| 3,561,409 | 2/1971 | August et al. ..................... 123/124 R |
| 3,872,845 | 3/1975 | Schultz ............................. 123/119 A |

Primary Examiner—Ronald H. Lazarus
Attorney, Agent, or Firm—Albert L. Jeffers; Roger M. Rickert

[57] ABSTRACT

A modification to or ancillary apparatus for carburetors for internal combustion engines to prepare liquid fuel for internal combustion engines by supplying supplementary air such as air or exhaust gas into the induction system downstream of the butterfly valve of the carburetor having at least one slit for discharging into the induction system supplementary air dependent upon a control member and its relation to the butterfly valve position. In one embodiment air enters through one slit at all times during engine operation to primarily improve idling mixture while air is supplied to the second slit in quantities dependent upon the butterfly valve position. In a second embodiment the air is supplied by way of one or more slits in quantities determined by the butterfly valve setting but without the continuous air supply independent of that butterfly valve position for idling mixture. In either embodiment the air enters the slits at very high speed and that speed approaches the speed of sound when the engine is idling for the one slit in the first embodiment and in part-load ranges of the engine for the other slits in either embodiment.

15 Claims, 9 Drawing Figures

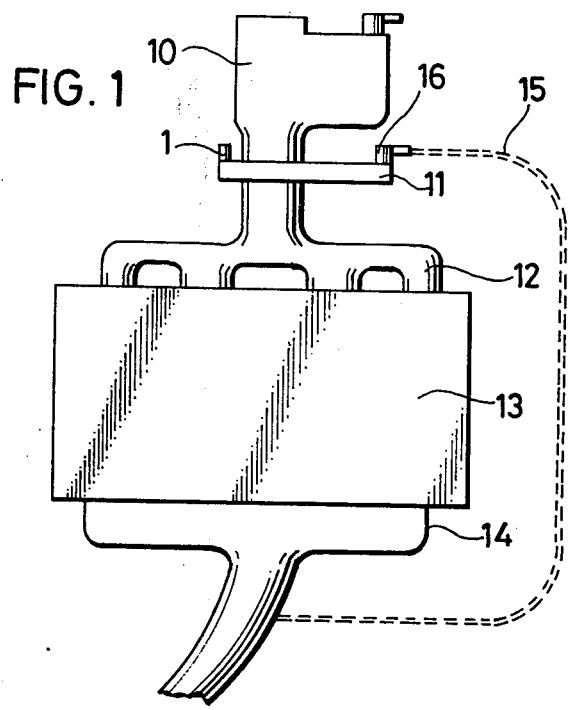
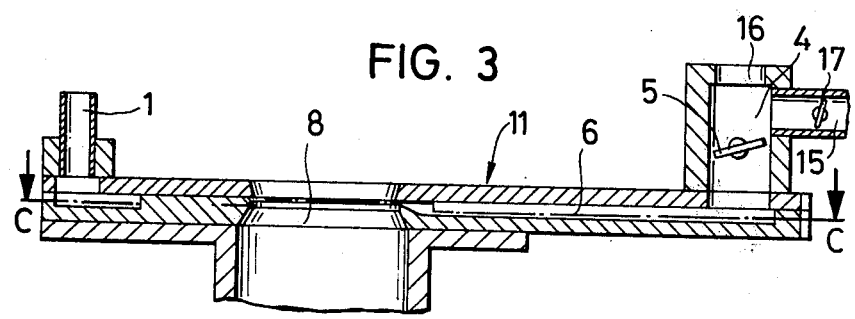
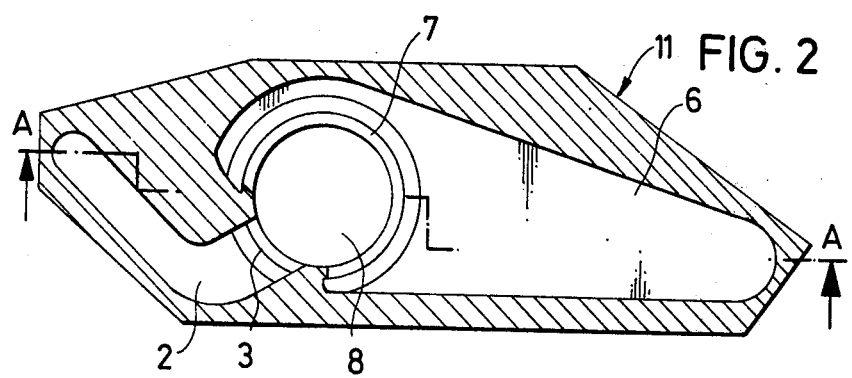

APPARATUS FOR THE PREPARATION OF FUEL MIXTURES FOR CARBURETORS

CROSS REFERENCE TO RELATED APPLICATIONS

This application is a continuation-in-part of my co-pending application Ser. No. 541,522, filed Jan. 16, 1975, now abandoned.

BACKGROUND OF THE INVENTION

This invention relates to improvements in apparatus for the preparation of fuel mixtures for carburetors.

The object of the invention is an apparatus for the preparation of liquid fuels for petrol engines and engines with a controlled fuel injection by the feeding of combustion air downstream of the throttle valve of the carburetor and of the injection device through two slots opposite one another in the exhaust passage from the carburetor or injection device. The invention further relates to an apparatus for the control of the accelerator pump and of the throttle valve of such internal combustion engines by the accelerator which is advantageously present in such an apparatus.

The problem of the invention is to prepare in idle running as well as also in the transition (increase from idle) and partial load operation of the engine, a combustible mixture such that fuel is finely atomized and the size of the mist drops is about a maximum of 0.5 mm.

SUMMARY OF THE INVENTION

The solution of this problem consists in that the slots are so dimensioned that in consequence of the lower pressure prevailing in the carburetor exhaust system or intake manifold of the engine, the combustion air in the idle running and/or in the transition and partial load operation of the engine flows from the slots at or almost at the speed of sound, whereby the direction of flow of the combustion air supplied is at right angles or substantially at right angles to the direction of exhaust from the carburetor. Due to the high speed of flow, the condensate forming on the walls of the exhaust opening is atomized as well as also in the center below the throttle valve of the carburetor due to the currents meeting one another at high speed a turbulence zone is produced which atomizes those fuel drops which are formed primarily in the idle running, transition and partial load operation of the engine.

Thus a uniform condensate and drop-free mixture is produced before the entry into the combustion chambers of the engine and the fuel contained therein is not deposited on the walls of the cylinder which leads to low CO and CH values. The operation with condensate and drop-free fuel air mixtures gives the smallest fuel consumption which is theoretically possible so that the combustion air sucked in is fully utilized.

When the combustion air in the idle running and transition range flows from the first slot and additionally the combustion air in the partial load range of the engine flows from the second slot at or about the speed of sound; in the combustion air feed to the slot in the partial load operation of the engine determining the speed of the combustion air, a control member, for example, a throttle valve is provided the opening of which depends on the opening of the carburetor throttle valve to give an improved adaptation of mixture preparation to the actual operating condition of the engine. In addition to or instead of combustion air, engine exhaust can also be fed to the slot effective in the partial load operation which as is known effects the reduction in the formation of NO.

If the apparatus is to be used as an additional apparatus for motor vehicles already in service the engines of which are provided with circulating air carburetors then it is expedient if the feed for combustion air in idle running is closed and opens only from transition operation of the engine. These modern carburetors already have in them a system for the preparation of the idle running mixture which would be disturbed if a further such system were effective in an additional apparatus according to the invention. As however with these circulating air carburetors the mixture improvement is effected only in the idle running and not in the transition and partial load operation, an apparatus according to the invention adapted to these conditions for the preparation of the mixture in the transition and partial load operation is very useful in respect of exhaust gas poisoning and utilization of fuel.

There is fed to the carburetor a fuel air mixture which contains condensate and fuel drops and, at high speed, combustion air and/or engine exhaust gases or other gases which are heated by a heat exchanger electrically and/or by means of exhaust gases are mixed therewith.

In consequence of the fine atomizing of the fuel with the apparatus according to the invention it is possible to operate with air excess also in the operating ranges of the engine in which hitherto operation had to be with excess of fuel. There is therefore achieved, besides an optimum utilization of fuel, an optimum fuel combustion and in conjunction therewith almost poison-free exhaust gases. Expansion devices for the detoxication of exhaust gases such as the insertion of catalysts or afterburners in the exhaust gas system are therefore superfluous or only necessary to a very limited extent.

Essential furthermore is to use, for the combination of the condensate and drop-free mixture preparation, a comparatively weak heat exchanger whereby the term weak heat exchanger relates to the fact that this prepares the fuel to a fine mist, but does not evaporate the fuel in the mixture.

Without such a fuel preparation before the heat exchanger in the outer area of the suction pipe there would be a richer mixture with condensate and in the minor part a poorer mixture. That means: if it is desired to prepare fully the poorer mixture with the high fuel portion then so much heat energy is needed that the poor mixture would be completely evaporated and exactly that is to be avoided.

Only the combination of the condensate and drop-free mixture preparation and homogeneous mixture composition brings about the said advantage with a heat exchange of low output.

The mixture is further based on the problem of carrying out the control of an accelerator pump so that at the moment of acceleration or of starting an immediate supply of combustion air with fuel is provided but in the interest of lower CO and CH values the adjustment of the fuel air mixture is carefully controlled.

A further object of the invention is also to achieve a better preparation of the fuel from the accelerator pump.

The solution of this problem consists in delay means known per se in the transmission of movement between the accelerator, accelerator pump and throttle valve connected so that with acceleration the accelerator pump is actuated before the throttle valve.

By this measure it is achieved that first of all the fuel mist is present which is easily taken up by the air and carried in this at the same speed to feed the engine. Thereby there results at the moment of acceleration or the starting an immediate supply of combustion air upon opening of the throttle valve with the finest fuel mist well distributed in the combustion air which is supplied, condensate and drop-free, uniformly to all cylinders.

Therefore in general and in one form of the invention, a carbureted mixture compressing internal combustion engine has apparatus for the preparation of liquid fuel which feeds supplementary air into the engine induction system downstream of a main butterfly valve of the carburetor by way of first and second opposed openings in the induction system where that supplementary air flows from the first opening at engine idling speed and additionally supplementary air flows from the second opening within a predetermined load range and depending upon a supplementary air control member. Means including the control member is effective only in the lower power range for limiting the air flow from the second opening while means including the second opening itself is effective from the medium power range on into the higher power ranges for limiting the air flow from that second opening. The supplementary air flowing from the second opening in the medium and higher power ranges flows at about the speed of sound. In one preferred form the control member is connected with and actuated in response to movement of the carburetor main butterfly valve. Typically, the first opening is downstream of and on the same side as the carburetor idling system and optionally exhaust gas may be supplied to the apparatus upstream from the control member. In any event from the medium power range onward the measuring cross-section, that is the cross-section where the greatest air velocity occurs, changes from the control member to the second slit or opening with the supplementary air flowing from that second opening at about the speed of sound. Also in general according to the invention, supplementary air flows from the two openings or slits at very high speed in the transition range of engine operation and at the speed of sound in the part load range of engine operation.

BRIEF DESCRIPTION OF THE DRAWING

Embodiments of the invention are described with reference to the accompanying drawings.

FIG. 1 is a diagrammatic representation of the arrangement of the apparatus according to the invention;

FIG. 2 is a section of apparatus on line C—C of FIG. 3;

FIG. 3 is a section of apparatus on line A—A of FIG. 2;

DESCRIPTION OF THE PREFERRED EMBODIMENTS

Figure 4:
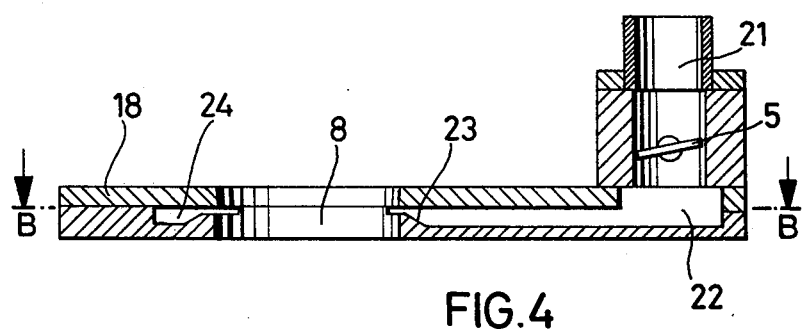
FIG. 4 is a section of apparatus which is provided as an additional apparatus to the circulating air carburetor.

Combustion air and fuel are fed separately to a carburetor 10 (FIGS. 1-3). The fuel air mixture produced in the carburetor arrives via the apparatus 11 for the feeding of the fuel-air mixture into the suction pipe 12 of the engine 13 from which the exhaust gases are led off via the exhaust pipe 14.

In idle running and in transition there emerges only or mainly fuel from the idle running system, not shown, of the carburetor, and is located on one side of the carburetor. Downstream of the carburetor, through the inlet 1, the passageway 2 and the slit 3 of the apparatus 11 is fed the quantity of air which the engine 13 requires for the idle running operation with the throttle valve of the carburetor closed. The slit 3 is designed to determine the quantity of air. It has in addition the effect of a Laval nozzle. In the area of a low pressure of more than 0.6 atmospheres the air flowing in through the slit 3 reaches the speed of sound. This means that in idle running and transition the air flowing in through the slit 3 enters at such a speed that it slows as far as the opposite wall and sweeps over almost the whole area below the throttle-valve. Fine condensate which is formed on the wall of the carburetor in idle running and transition running meets the slit 3 and is finely atomized. The apparatus 11 has a further feed 4 which is provided with a control valve 5. To the control member there is connected a passageway 6 in the member 11 which with the slit 7 forms the limitation for the manifold 8 for the fuel-air mixture. The control valve 5 is connected to the carburetor throttle valve so that when idle running it is closed and then with the opening of the carburetor throttle valve it is likewise opened. The slit 7 with its passage is so designed that upon opening the control valve 5 at a vehicle speed of about 31-37¼ miles per hour (50-60 km per hour), that is, at a low to medium engine output the highest possible passageway of air is achieved. This means that with this partial load speed the air flowing through the slit 7 has a very high velocity up to the speed of sound. An entry of gas is now allowed on the remaining periphery of the passage 8 which acts in a condensate removing manner and additionally removes drops forming under the carburetor throttle-valve. Both gas and the air currents which enter through the slits 3 and 7 strike against one another in the fuel air inlet manifold 8 at high flow, velocity and cause the atomization of condensate and fuel drops.

The slits or openings 3 and 7 are designed as Laval jets or nozzles. A Laval nozzle is typically described in the literature as a converging-diverging nozzle having circular cross-section in the restriction area. In the present invention the effects of Laval nozzles are achieved by the arcuate slit-like nozzles 3 and 7 which gradually converge in a radially inward direction.

Prior art arrangements for providing supplementary air typically employ a valve which opens only at higher speeds and the flow rate of such supplementary air thereafter increases as the engine speed increases. With such prior art systems, relatively high nitric oxide concentrations are present in the exhaust gas. With the present arrangement, however, from the middle load range onwardly the measuring cross-section, that cross-section which limits the flow rate becomes that of the slit or opening 7 which supplies the supplementary air at about the speed of sound. With this arrangement, the poisonous gas constituents of the exhaust and particularly the nitric oxide content is considerably reduced over practically the entire speed range of the engine.

At idling speed, air enters the inlet 1 of FIG. 3 and by way of the passage 2 and slit 3 enters the carburetor throat region beneath the idling speed mixture side. During idling, this air constitutes from 80–100% of the engine requirement. At this time, the carburetor butterfly valve is completely or nearly closed and the slit 3 has a measured cross-section such that the air flowing therethrough reaches a very high velocity which in one embodiment ranged from about 100 meters per second up to about the speed of sound, in the neighborhood of 340 meters per second.

From the part load to full load ranges, the valve or control member 5 is open, due to movement of the carburetor butterfly valve, and air enters by way of inlet 16 and passage 6 through the opening 7. In the range of 60–80 kilometers per hour the passage through the butterfly valve 5 becomes larger than the passage of the slit or opening 7, and at this time, as well as for increased speed, the slit or opening 7 becomes the metering cross-section.

As noted earlier, both slits 3 and 7 are flattened, generally arcuate Laval jets and due to the passage of additional air through these slits at very high speed up to the speed of sound, fuel condensate is microatomized with great flow energy. Condensate will typically creep along the wall of the carburetor and intake manifold at about ten centimeters per second, when the supplementary air enters at its very high speed, the condensate is picked up, rapidly accelerated, and atomized. This high speed entry of air through the openings 3 and 7 engages the entire space below the carburetor butterfly valve to microatomize larger fuel droplets forming there. Thus with very low carbon monoxide and hydrocarbon pollutants, the oxides of nitrogen may be reduced in the exhaust by about seventy-five percent employing the present invention and without requiring afterburners or catalytic converters. Further, the overall fuel consumption may be reduced by about ten percent as compared to similar devices lacking the features of the present invention.

The feed 4 is provided with combustion air through an opening 16. In addition a further feed 15 may be provided which is connected to the exhaust pipe 14 of the engine 13. A further control valve 17 which is in communication with the control valve 5 as well as with the throttle-valve, (not shown) of the carburetor 10, allows for the admixing of exhaust gas from the exhaust pipe 14 according to the load operation of the engine so that, through the fresh air inlet 1 and the slit 3 together with the inlet 16, a fuel air mixture with an excess of air is fed to the manifold 8 to the induction pipe 12 of the engine.

The control for the feeding of the exhaust gas takes place via the control valve 17 so that in the whole partial load range of the engine, possibly idle running excepted, excess of air prevails in the fuel air mixture so that the constituent parts contained in the fuel-air mixture are completely burnt without injurious exhaust gases due to incomplete combustion leaving the engine. It is important that in the idle running operation of the engine in which the entry of the additional air is effected substantially via the slit 3 as well as in partial load operation of the engine in which the additional air is effected via the slit 3 and also via the slit 7, the fuel air mixture in the manifold 8 in consequence of the additional air emerging from the slits 3 and 7 which currents of additional air collide against one another and are finely atomized and, due to the dimensions of the slits 3 and 7 and adaptation of the carburetor 10, an excess of air prevails which feeds uniformly to each individual cylinder of the engine a homogeneous fuel air mixture with finely distributed fuel particles with excess of air.

Furthermore the feeding of exhaust gas via the control valve 17 effects in the partial load range a lowering of the NO content which contributes to the further detoxication of the exhaust gases.

Figure 5:
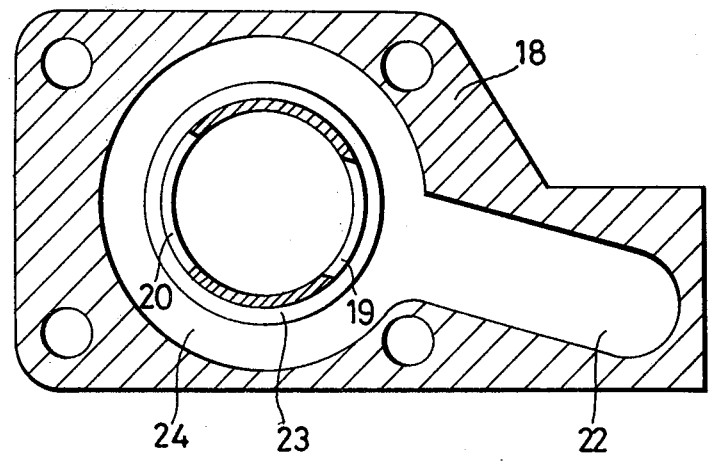
FIG. 5 is a section on line B—B of FIG. 4.

In FIGS. 4 and 5 an apparatus is shown which feeds additional combustion air only after the transition range of the engine and which is designed as an additional apparatus for circulating carbureted air and is designated by 18. The apparatus 18 is built in at the same place as the apparatus 11 according to FIG. 1. The carburetor 10 has in this case already a circulating air system for idle running operation. Under the idle running system, not shown, is located a slit 19 of the apparatus and on the opposite side, an inlet slit 20. Additional air is sucked in via an inlet 21 and controlled by a control valve 5 manifested as a throttle-valve and flows via a passageway 22 into an annular channel 24 which connects the slits 19 and 20 to one another.

The additional air sucked in first reaches the slit 19 and emerges into the manifold 8. On the opposite side additional air enters a little later through the slit 20. A restriction 23 increases the speed of the additional air, up to the speed of sound when the slits 19 and 20 form the measurement cross-section. Also with this apparatus 18 the air currents entering through the slits 19 and 20 meet at high speed up to the speed of sound approximately in the center under the throttle-valve of the carburetor. The feed of the combustion air through the slit 19 which is located in the flow of the idle running system of the carburetor has also a high effectiveness when it commences from the transition operation. With known circulating air carburetors the combustion air for idle running is fed next to a bypass hole and therefore is only effective for producing an idle running mixture. It has no longer any positive action for the improvement of the mixture formation in the transition range. If in the flow of the idle running system of such a carburetor which also delivers the fuel for the transition operation, the combustion air enters through the slit 19 at higher speed up to the speed of sound, the drawback of such carburetors namely faulty mixture preparation in the transition and partial load range is removed and the whole fuel condensate and drops of fuel forming under the throttle-valve are finely atomized by the air entering through the slits 19 and 20.

Figure 6:
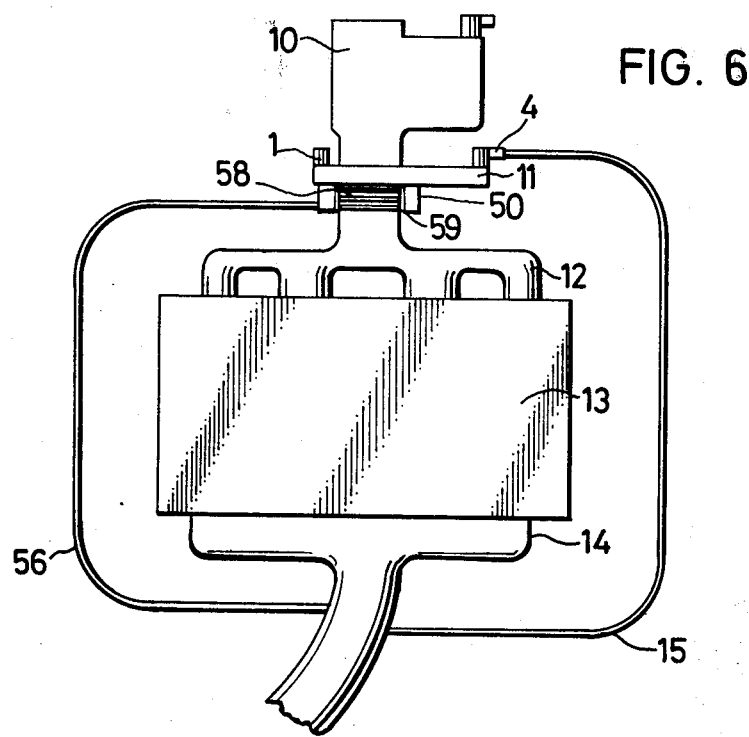
FIG. 6 is a diagrammatic view similar to FIG. 1 of a further embodiment.
Figure 7:
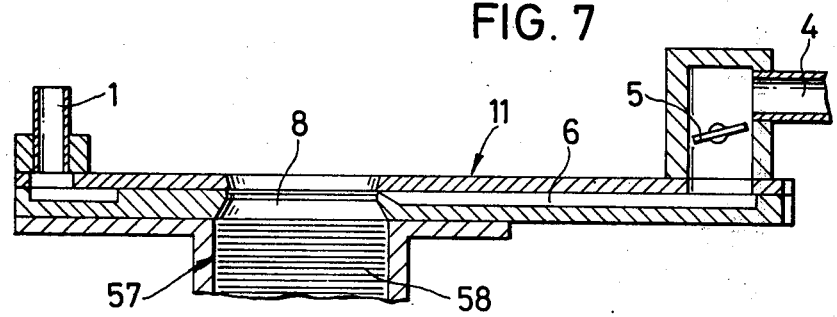
FIG. 7 is a section similar to FIG. 2 of the embodiment according to FIG. 6.

Exhaust gas from the exhaust pipe 14 of the engine 13 can be led to the feed 4 on the apparatus 11 via the feed 15 (FIGS. 6 and 7). This mixing of exhaust gases with the combustion air brings about a lowering of the NO content in the exhaust gas by about 60–70%.

Downstream of the apparatus 11 (FIG. 7) there is disposed a heat exchanger 57 by which the fuel is atomized to a size of drop not more than $1\mu$. The heat exchanger has heating wires 58 which are connected to the electric network if necessary with the insertion of a control device, not shown. Additionally the heat exchanger has an annular heating chamber 50 in which a heating gas pipe 56 leads from the exhaust pipe 14 of the engine 13. The heat exchanger is of importance for cold starting because of the higher condensate attack with a cold engine upon starting the mixture has to be additionally enriched. This induces however higher engine wear upon starting than during the warm running range as the higher condensate formation leads to thinning of the lubricating oil. In addition there results a greatly increased fuel consumption for short distance travelling which may amount to as much as twice the consumption during normal long distance, travelling. Furthermore the exhaust gases contain with cold starting and warm running conditions high concentrations of CO and CH which, especially in short distance occupational travelling in cities leads to a very high loading of the air with poisonous gases. The heat exchanger renders it possible for a mixture composition to be fed to the engine a few seconds after cold starting which corresponds to the operation with a working warm engine without the running quality of the engine being adversely affected. This measure brought about upon cold starting and warm running of the engine gives a lowering of the CO and CH concentrations by more than 50%.

The heat exchanger upon cold starting of the engine is heated by the feeding of current to the heating wires 58. The current feed is so designed that upon switching on the ignition the wires of the heat exchanger become hot but not red hot. At the moment when the engine is running and the current generator supplies current, the current feed is increased and a fine atomizing but no evaporation of the fuel takes place. Another operating possibility consists in that the heat exchanger is only heated electrically when the generator supplies current. That means that only with running of the engine is the heat exchanger heated.

The quantity of current fed is so limited that it only extends as far as a certain partial load range of about 50-60 km per hour on the level for the complete atomizing of the fuel. Additional heat energy of the exhaust gases is fed via the heating chamber 50 to the heat exchanger. When the heat exchanger, due to the exhaust gases, has reached a predetermined temperature the supply of current is switched off. The quantity of exhaust gases supplied is limited so far that a complete atomizing of the fuel is achieved only up to a certain partial load range which according to the power of the vehicle is between the speeds of 31-50 miles per hour (50-80 km per hour) on the level. The heating of the fuel-air mixture becomes increasingly less upon the output becoming increasingly greater and which at full load is hardly heated at all so that in this output range the degree of efficiency of the engine due to the heating of the fuel-air mixture is not adversely affected.

The described preparation of the fuel to the finest mist, homogeneously distributed in the combustion air causes in addition a very mild combustion which contributes additionally to the lowering of the NO concentration in the exhaust gases.

By the method according to the invention accordingly a substantially complete combustion without CO concentration in the exhaust gas is obtained. The CH concentration in the exhaust gas are reduced to a minimum and the NO formation upon combustion lowered by more than 70%. Furthermore the lowest fuel consumption possible with full utilization of the combustion air is achieved.

In order to operate the heat exchanger independently of the operating range of the combustion engine it is essential for the electric heating of the heat exchanger to be thermostatically controlled. Such a possibility must be present, for example, with longer valley journeys if thereby the exhaust gases used perhaps previously for the heating have cooled so far that a satisfactory preparation is no longer possible. For this case then independently of a certain minimum temperature the electric heating of the heat exchanger is switched on, provided that at the same time also the dynamo or the generator is running.

In order to maintain temperatures as uniform as possible in the range of the heat exchanger there exists a further possibility of the invention by heating the apparatus 11, for example, by additional passageways, ribs or the like through which flows a heat supplying liquid or gaseous medium.

By this measure an approximately uniform operating condition in the preparation of the mixture and the following substantial advantage is achieved namely in the range where condensate is formed and is removed by additional air, a heating takes place which again contributes substantially to the better preparation and mixture formation because in the region of the formation of condensate the temperature is reduced. That is compensated for by an additional heating.

In this connection it is further an advantage for a heat storer to be present through or around which flows the liquid or gaseous medium to heat the casing of the apparatus 11 directly or indirectly.

By this measure greater temperature fluctuations within the range of the condensate preparation and of the heat exchanger will be avoided which may result from different operating conditions of the engine (valley travelling, mountain travelling, etc.)

All these advantages are achieved with a complete apparatus which is so simple and cheap that the prime costs are soon covered by the saving of fuel.

Figure 8:
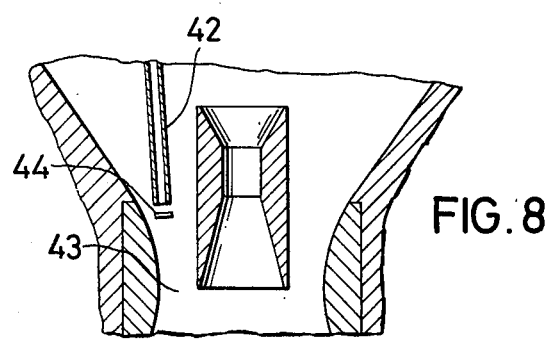
FIG. 8 shows a part of the carburetor according to FIG. 9 with the injection tubes according to the invention.
Figure 9:
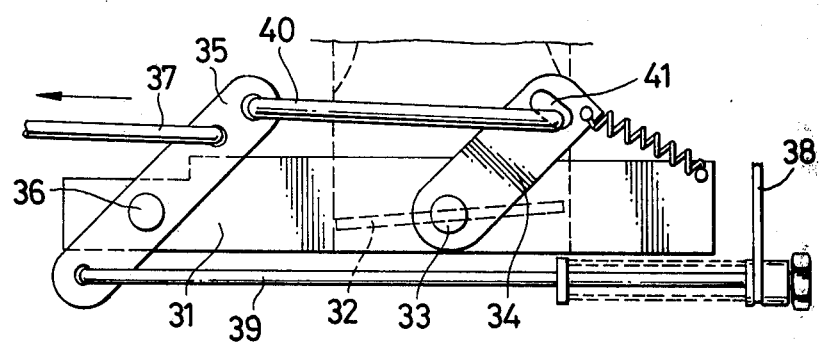
FIG. 9 shows the foot of a carburetor with a delay device for the throttle valve.

The apparatus shown in FIGS. 8 and 9 is explained more precisely in the following.

In the carburetor foot 31 is located a throttle valve 32 with a throttle valve spindle 33 and a throttle valve lever 34. A second lever 35 is fixed on a shaft 36. The accelerator lever 37 is connected to this lever 34 which accelerator lever upon accelerating pulls in the direction of the arrow. The lever 35 is connected without play, to the lever 38 of an accelerator pump by means of the lever 39. A second connection to the lever 35 also occurs by means of the lever 40 this time to the throttle-valve lever 34. This lever however engages in a slot 41 so that with the opening movement of the lever 35 the lever 40 first traverses a certain path before it comes into contact with the other end of the slot 41 and only then operates the throttle valve lever 34 of the carburetor throttle-valve 32.

By means of this apparatus, upon accelerating first of all and immediately the lever 38 of the accelerator pump is actuated so that without delay fuel is injected via injection tubes 42 into a mixing chamber 43 of the carburetor.

The opening of the carburetor throttle-valve 32 is effected a little later so that there is already fuel in the mixing chamber 43 of the carburetor when the throttle-valve is opened and the air current is introduced to the carburetor.

In order that the jet of fuel which emerges from the injection tubes 42 is better presented to the air flowing through and can be taken up and distributed uniformly, a baffle plate 44 is placed a little below the outlet end of the injection tubes 42. The fuel jet meets this and is atomized into a mist around the baffle plate.

Thus this fuel mist can be easily picked up by the air and carried therein at the same speed and can be fed to the engine. There thus results at the moment of acceleration or of starting an immediate supply of combustion air upon opening the throttle valve with a fine fuel mist well distributed in the combustion air which fuel mist is fed free of condensate and free of drops uniformly to all cylinders.

The early operation of the lever of the accelerator pump is necessary so that a fuel mist already formed on the baffle plate 44 is available when the throttle valve is opened and the air current applied. With simultaneous operation of the carburetor throttle-valve and the accelerator pump there is for a moment an air flow without added fuel as the heavier fuel appears later than the lighter air.

With the hitherto known richer fuel adjustment for idle running and transition this short time lack of fuel does not make itself noticeable.

As now in the interest of lower CO and CH values the adjustments of the fuel air mixture are at about A1 and over it was necessary to remove the corresponding hole in the acceleration by the measure according to the invention.

The apparatus described in conjunction with FIGS. 8 and 9 also may be driven without the apparatus according to FIGS. 1-7.

In summary then, with a device according to the present invention, the slits or openings 3 and 7 which are Laval jets, function as the metering cross-sections over a substantially wide range of engine operating speeds and air enters through these slits in nearly all operating ranges of the engine at very high speeds up to the speed of sound. The air streaming in at a very high speed has the dynamic force to break up the fuel condensate into very fine particles so that the mixture is free of droplets and condensate, resulting in a more even distribution to the cylinders and a very homogeneous mixture. With this arrangement, the engine can operate without misfiring with lambdas of between 1.2 and 1.4 (an excessively lean mixture with between 20 and 40% excess air). This homogeneous mixture with microatomized fuel and excess air provides good combustion with almost no carbonmonoxide (0.1 to 0.15%) in the exhaust and very little hydrocarbon pollutants (40 to 80 parts per million) in the exhaust, and lastly, and primarily due to the air excess, very little pollution in the form of oxides of nitrogen. This last result is thought to be due at least in part to the fact that the excess air reduces the combustion temperature. Compared with normal operation without the present inventive concept, these oxides of nitrogen are reduced by 75-85% when employing the techniques of the present invention.

Thus while the present invention has been described with respect to specific preferred embodiments, numerous modifications will suggest themselves to those of ordinary skill in the art, and accordingly the scope of the present invention is to be measured only by that of the appended claims.

What is claimed is:

1. In a carbureted mixture compressing internal combustion engine having apparatus for the preparation of liquid fuels by feeding supplementary air into the engine induction system downstream of a main butterfly valve of the carburetor by way of first and second opposed openings in the induction system where supplementary air flows from the first opening at engine idling speed and supplementary air flows from the second opening within a predetermined load range and depending upon a supplementary air control member, the improvement comprising:

means including the control member, and effective only in the lower power range, for limiting the air flow from the second opening; and
   means including the second opening, and effective from the medium power range on into the higher power ranges, for limiting the air flow from the second opening, the supplementary air flowing from the second opening at about the speed of sound in the medium and higher power ranges with the air flow rate remaining relatively constant throughout the medium and higher power ranges.

2. The improvement of claim 1 wherein the control member is connected with and actuated in response to movement of the main butterfly valve of the carburetor.

3. The improvement of claim 1 further comprising means for supplying exhaust gas to the apparatus upstream from the control member.

4. The improvement of claim 1 wherein the first opening is downstream of and on the same side as the carburetor idling system.

5. A device for the preparation of liquid fuels for mixture compressing internal combustion engines by supplying supplementary air into an induction system downstream of a main butterfly valve of a carburetor comprising: a manifold downstream of the main butterfly valve and having first and second opposed air admitting arcuate slits extending part way around the manifold, supplementary air flowing from the first slit at idling speed at nearly the speed of sound, a passageway for supplying air to the second arcuate slit, and a control member coupled to the butterfly valve for controlling the supply of air through the passageway and to the second arcuate slit within a predetermined load range and in relation to the butterfly valve opening; the second slit being designed as a Laval jet having an arcuate slit which gradually converges in a radially inward direction to supply supplementary air at very high speed in the transition range of engine operation and to supply supplementary air at a speed near the speed of sound in the part-load range of engine operation so that the cross-section which limits the air flow from the second arcuate slit changes from that determined by the control member to that of the second slit from the medium power range onward with the supplementary air flowing from the second slit at about the speed of sound.

6. The device of claim 5 further comprising a second passageway independent of the control member for supplying air to the said one slit.

7. The device of claim 5 wherein the control member comprises a throttle valve disposed in the air passageway and mechanically coupled to the carburetor butterfly valve.

8. The device of claim 7 wherein the control valve is substantially completely closed when the engine is idling.

9. The device of claim 5 further comprising means for supplying engine exhaust gases to said passageway.

10. The device of claim 9 wherein the means for supplying engine exhaust gases includes a further throttle valve controllable in accordance with the operating range of the engine to determine the quantity of exhaust gases to be supplied to the passageway.

11. The device of claim 10 wherein the further throttle valve is controlled so as to provide an excess of air for the fuel-air mixture entering the engine.

12. The device of claim 5 wherein the first slit is located downstream of the idle running system of the carburetor on the side on which the idle running nozzle system of the carburetor is disposed.

13. A carbureted mixture compressing internal combustion engine having apparatus for the preparation of liquid fuels by feeding supplementary air into the engine induction system downstream of a main butterfly valve of a recirculated air carburetor by way of first and second opposed openings in the induction system where supplementary air flows from the openings depending upon a supplementary air control member, means including the control member, and effective only in the transition range, for limiting the air flowing from the openings; and
means including the openings for limiting the air flow from the openings at about the speed of sound in the part load range with the air flow rate remaining relatively constant from the part-load range on into the higher power ranges.

14. The improvement of claim 13 wherein the control member is connected with and actuated in reponse to movement of the main butterfly valve of the carburetor.

15. The improvement of claim 13 further comprising means for supplying exhaust gas to the apparatus upstream from the control member.

* * * * *